(12) United States Patent
Beckett

(10) Patent No.: US 6,904,497 B1
(45) Date of Patent: Jun. 7, 2005

(54) METHOD AND APPARATUS FOR EXTENDING STORAGE FUNCTIONALITY AT THE BIOS LEVEL

(75) Inventor: Peter H. Beckett, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 34 days.

(21) Appl. No.: 09/962,980

(22) Filed: Sep. 21, 2001

(51) Int. Cl.[7] .............................................. G06F 12/00
(52) U.S. Cl. ............................ 711/114; 710/8; 710/48; 710/74; 710/301; 710/311
(58) Field of Search ................................ 710/8, 10, 22, 710/48, 104, 261, 300, 301, 308, 311, 313, 72, 74, 260; 711/111, 112, 114, 147, 153, 154, 170, 173; 719/325

(56) References Cited

U.S. PATENT DOCUMENTS

| | | | |
|---|---|---|---|
| 5,471,586 A | * 11/1995 | Sefidvash et al. | 710/104 |
| 5,613,137 A | * 3/1997 | Bertram et al. | 710/1 |
| 6,078,990 A | * 6/2000 | Frazier | 711/114 |
| 6,108,719 A | * 8/2000 | Klein | 710/10 |
| 6,141,703 A | * 10/2000 | Ding et al. | 710/10 |
| 6,154,789 A | * 11/2000 | Grieff et al. | 710/14 |
| 6,446,141 B1 | * 9/2002 | Nolan et al. | 710/8 |
| 6,502,156 B1 | * 12/2002 | Sacker et al. | 710/305 |
| 6,519,679 B2 | * 2/2003 | Devireddy et al. | 711/114 |
| 6,564,271 B2 | * 5/2003 | Micalizzi et al. | 710/39 |
| 6,622,182 B1 | * 9/2003 | Miller et al. | 710/29 |
| 2002/0089806 A1 | * 7/2002 | Hamilton et al. | 361/227 |
| 2002/0099875 A1 | * 7/2002 | Locklear et al. | 710/2 |
| 2002/0194409 A1 | * 12/2002 | Marr et al. | 710/260 |
| 2003/0041211 A1 | * 2/2003 | Merkey et al. | 711/114 |
| 2003/0056032 A1 | * 3/2003 | Micalizzi et al. | 710/5 |

FOREIGN PATENT DOCUMENTS

EP 0 798 629 A2 * 10/1997 ............. G06F/3/06

OTHER PUBLICATIONS

"How to connect an IDE disk to a microcontroller using an 8255," Faase, P. Mar. 3, 1998. http://www.xs4all.nl/~ganswijk/chipdir/abc/ide/idpeter.txt.*

* cited by examiner

*Primary Examiner*—Christian P. Chace
(74) *Attorney, Agent, or Firm*—Martine Penilla & Gencarella, LLP

(57) ABSTRACT

A method and apparatus for implementing RAID through control of the IO channels on the motherboard is provided. One exemplary method locates IO channels on a motherboard. Next, the IO channels on the motherboard are controlled where the IO channels are configured to communicate with a storage media. Then the storage media associated with the IO channels is managed as a RAID. Some notable advantages of the discussed methods and apparatuses include the simplicity of implementing the host based RAID through existing infrastructure contained within a computing system. Additionally, the added benefits of improving reliability and system performance associated with a RAID subsystem are made available in a cost effective manner because most of already existing infrastructure.

16 Claims, 4 Drawing Sheets

METHOD AND APPARATUS FOR EXTENDING STORAGE FUNCTIONALITY AT THE BIOS LEVEL

BACKGROUND OF THE INVENTION

1. Field of the Invention

This invention relates generally to methods and structures for implementing software redundant array of inexpensive disks (RAID) logic and more particularly using a central processing unit (CPU) and input/output (IO) devices of a host to implement software based RAID.

2. Description of the Related Art

A computer system typically requires large amounts of secondary storage, such as a disk drive, to store information (e.g. data and/or application programs). Redundant arrays of inexpensive disks (RAID) subsystems are commonly employed to address the large storage requirements. In addition, RAID subsystems provide a high degree of reliability because of their redundant nature.

RAID storage systems can be implemented in hardware or software. In the hardware implementation the RAID algorithms are built into a controller card that connects to the computer input/output (IO) bus. However, including a full-RAID intelligent controller adds significant cost to the RAID subsystem. In, the software implementation of RAID, commonly referred to as host based RAID, the RAID algorithms are incorporated into software that runs on the main processor in conjunction with the operating system. In software based RAID, the operating system, such as WINDOWS NT™ or NOVELL NETWARE™, running on the host CPU, handles all the array control functions. Accordingly, software based RAID is a low cost RAID implementation with no added expense for array control hardware. However, current add-on implementations of host based RAID require the user to purchase RAID specific IO channels in order to plug into the motherboard.

As a result, there is a need to solve the problems of the prior art to provide host based RAID that is able to take over any channels or IO devices on the motherboard without the need to purchase RAID specific IO channels.

SUMMARY OF THE INVENTION

Broadly speaking, the present invention fills these needs by providing a method and apparatus for implementing host based RAID without the added expense for array control hardware.

In one embodiment, a method for implementing host based RAID is provided. In this embodiment, the method begins by locating IO channels on a motherboard, the IO channels being configured to send interrupts to a host CPU. Next, the IO channels on the motherboard are controlled. Then a set of disks are identified, where the disks are in communication through the IO channels on the motherboard. Finally the disks are managed in a RAID implementation.

In another embodiment, a method for implementing RAID through control of the native IO channels on the motherboard is provided. In this embodiment, the method begins by locating IO channels on a motherboard. Next, the IO channels on the motherboard are controlled with the IO channels being configured to communicate with a storage media and the storage media being configured to store data. Finally the storage media associated with the IO channels is managed in a RAID implementation.

In yet another embodiment, an apparatus for implementing host based RAID is provided. The apparatus includes a central processing unit (CPU). Also included is a communication chip, the communication chip containing native input/output (IO) channels. A storage media is included, the storage media being accessed through the communication chip. A system basic input output system (BIOS) is included where the system BIOS includes code enabling control of the IO channels to manage the storage media associated with the IO channels as a RAID implementation.

In still another embodiment, an apparatus for implementing host based RAID is provided. The apparatus includes a central processing unit (CPU). Also included is a communication chip, the communication chip containing native input/output (IO) channels. A plurality of storage devices are included, the storage devices being accessed through the communication chip. A system basic input output system (BIOS) is included. A RAID IO channel capture read only memory (ROM) chip having an input/output processor (IOP) is also included. The ROM chip being configured to execute I/O channel identification and capture code, where the code enables control of the native IO channels to manage the plurality of storage devices associated with the native IO channels in a RAID implementation. Finally, at least one bus interconnects the CPU, the system BIOS, the ROM chip and the communication chip.

In still yet another embodiment, an apparatus for implementing host based RAID is provided. The apparatus includes a central processing unit (CPU). Also included is a communication chip, the communication chip containing native input/output (IO) channels. A storage media is included, the storage media being accessed through the communication chip. A system basic input output system (BIOS) is included. A plug in card the plug in card accommodating a RAID IO channel capture read only memory (ROM) chip having an input/output processor (IOP) is also included. The ROM chip being configured to execute I/O channel identification and capture code, where the code enables control of the IO channels to manage the storage media associated with the I/O channels in a RAID implementation. Finally, at least one bus interconnects the CPU, the system BIOS, the plug in card and the communication chip.

The advantages of the present invention are numerous. Most notably, the invention provides for the implementation of host based RAID without incurring any costs for hardware accessories. In addition, the user is allowed the flexibility of installing a RAID implementation simply without in depth knowledge of RAID implementation.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system and method for implementing host based RAID using existing input/output (IO) channels. It will be obvious, however, to one skilled in the art, that the present invention may be practiced without some or all of these specific details. In other instances, well known process operations have not been described in detail in order not to unnecessarily obscure the present invention.

The embodiments of the present invention provide a system and method for implementing host based RAID through existing IO channels on the motherboard in a cost effective manner which is transparent to a user. The implementation of the present invention and its various embodiments are achieved through host based software executed by a microprocessor for managing the IO channels existing on the motherboard of a computer. The code is configured to control the IO channels, and thus any storage devices attached thereto, so as to provide host based RAID. In accordance with one embodiment of the invention, the RAID code is embedded in the system basic input output system (BIOS) of a computer. With this embodiment, the code logically extends the system BIOS to provide RAID functionality using available IO channels on the motherboard.

Since host based RAID is implemented using the system's central processing unit (CPU), a separate input output processor (IOP) is not needed as is required for more expensive hardware implemented RAID. The RAID management functionality as well as the code for identifying and controlling the IO channels on the motherboard is embedded in the BIOS in accordance with one embodiment of the invention. As such, upon system start-up the code will be executed to take control over the IO channels on the motherboard. In another embodiment, the code is contained in a read only memory (ROM) chip that can be integrated onto the motherboard or on an adapter card capable of being plugged into the motherboard. In this alternative embodiment, the RAID code and code to take over IO channels are no longer stored on the system BIOS.

Discussed below are various hardware illustrations for implementing the code that provides the functionality for managing available IO channels on the motherboard and processing data in a RAID environment. It should be appreciated that the hardware implementations are provided for illustration purposes only and are not meant to limit the invention.

Figure 1:
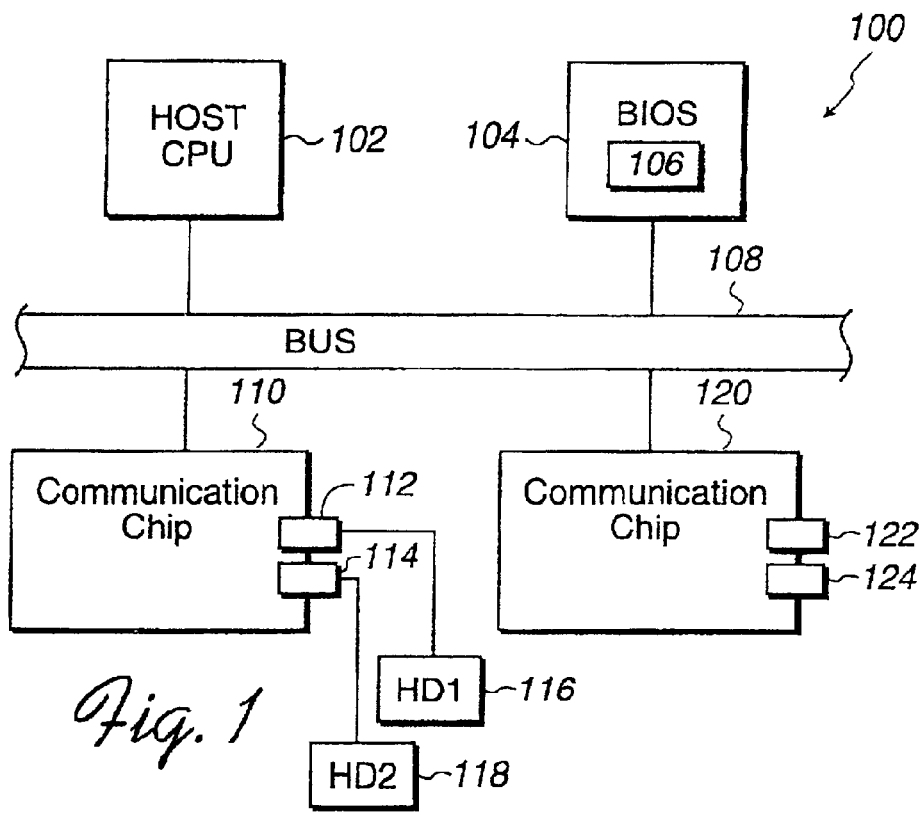
FIG. 1 illustrates a block diagram displaying an apparatus for implementing host based RAID through software code contained in a basic input output system (BIOS) in accordance with one embodiment of the invention.

FIG. 1 illustrates block diagram 100 displaying an apparatus for implementing host based RAID in accordance with one embodiment of the invention. A host central processing unit (CPU) 102, a system basic input output system (BIOS) 104, and communication chips 110 and 120 are attached to a bus 108. The BIOS 104 contains embedded software code 106 for identifying and controlling input/output (IO) channels 112, 114, 122 and 124 of communication chips 110 and 120 and managing the IO channels as a RAID. In accordance with one embodiment, the software code is I/O channel identification and capture code. In accordance with another embodiment of the invention, the communication chips 110 may be small computer interface (SCSI) chips, ATA chips, and the like. In accordance with another embodiment of the invention the IO channels 112, 114, 122 and 124 send interrupts to the host. Connected to 10 channel 112 is hard drive 1 (HD1) 116. Attached to IO channel 114 is HD2 118.

For illustration purposes, FIG. 1 shows two IO channels on each of the two communication chips. It should be appreciated that any number of IO channels may be on the communication chips, limited only by the design specifications of the communication chip. It should further be appreciated that any number of communication chips may be attached to the bus 108. As mentioned above, the embedded software code 106 harbors the instructions to be executed by the CPU 102 to take over the IO channels and manage the storage media attached to the IO channels as a RAID, thereby creating a RAID environment for data storage. Upon start-up of the computer, the CPU 102 will execute the code 106 to identify the IO channels native to the motherboard in accordance with one embodiment of the invention.

Figure 2:
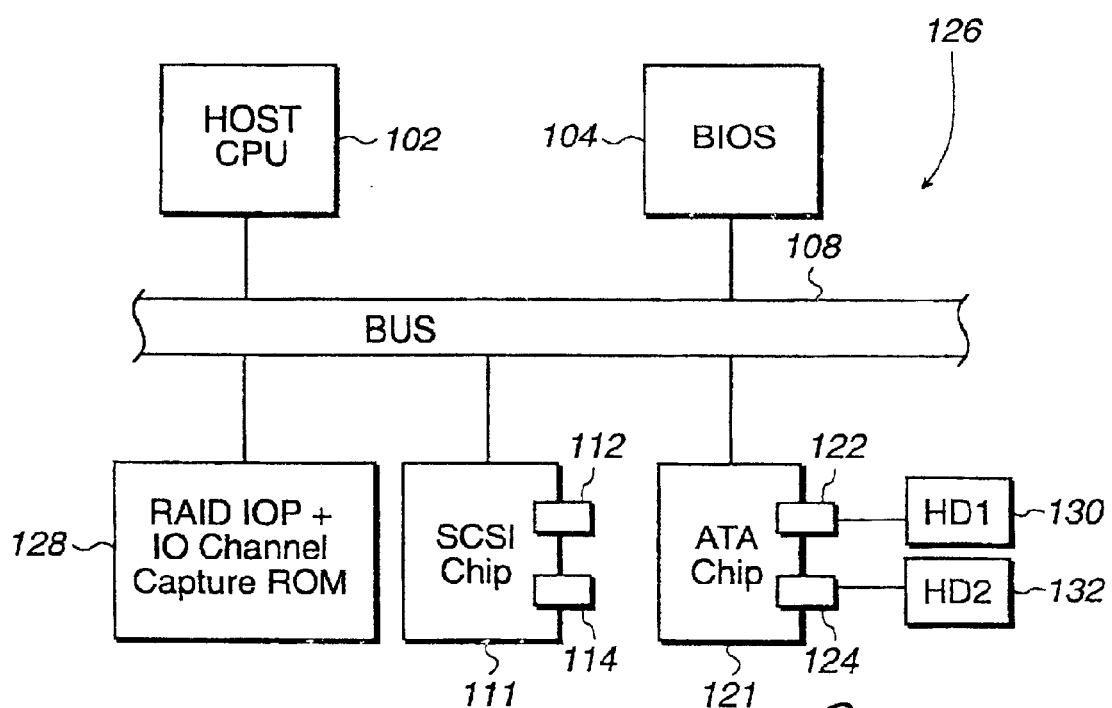
FIG. 2 illustrates a block diagram displaying an apparatus for implementing host based RAID through a RAID IO channel capture read only memory (ROM) in accordance with one embodiment of the invention.

FIG. 2 illustrates block diagram 126 displaying an apparatus for implementing host based RAID in accordance with one embodiment of the invention. With this embodiment, a RAID IO channel capture read only memory (ROM) chip 128, a SCSI chip 111 and an ATA chip 121 are attached to a bus 108. In accordance with one embodiment of the invention, the bus 108 is a peripheral component interconnect (PCI) bus. The RAID IO channel capture ROM contains the embedded software code for identifying and controlling IO channels 112 and 114 of SCSI chip 111 and channels 122 and 124 of ATA chip 121. Attached to IO channels 122 and 124 are hard drive 1 (HD1) 130 and hard drive 2 (HD2) 132, respectively. In accordance with one embodiment of the invention, the RAID IO channel capture ROM 128 (which includes a RAID IOP) executes and contains the embedded software code to manage the storage media attached to any of the IO channels, such as HD1 130 and HD2 132 as a RAID. In accordance with another embodiment, the IO channel capture code is executed by the CPU 102.

The RAID IO channel capture ROM of FIG. 2 is integrated onto the motherboard of a computer system in accordance with one embodiment of the invention. As will be explained in more detail in reference to FIG. 3, the RAID IO channel capture ROM may also be integrated onto a plug-in card. Accordingly, it should be appreciated that the host based implementation of RAID will allow the user to benefit from the advantages of RAID such as improved 10 performance and data availability. The addition of the ROM chip and the embedded software code to the motherboard by hardwiring or through a plug-in card allows users to take full advantage of the existing IO channels and any disks to implement RAID. It should be appreciated that the RAID information processing is performed internally by the RAID IOP and the IO channel capture code stored in the ROM chip. This makes it transparent to the computing system, thereby offloading these tasks from the host CPU 102.

It can be appreciated this embodiment makes the RAID subsystem appear to the host computer as a single, highly reliable, high capacity disk drive. In accordance with one embodiment of the invention, the RAID IO channel capture ROM chip executes the code containing the instructions for managing the RAID implementation so as to distribute data to the host system across a plurality of small independent drives with redundancy and error checking information, thereby improving system reliability. Accordingly, the host CPU 102 simply requests blocks of data to be read or written and the RAID IO channel capture ROM chip manages the disk array as required. Thus, the host CPU 102 is able to more efficiently perform other tasks.

Figure 3:
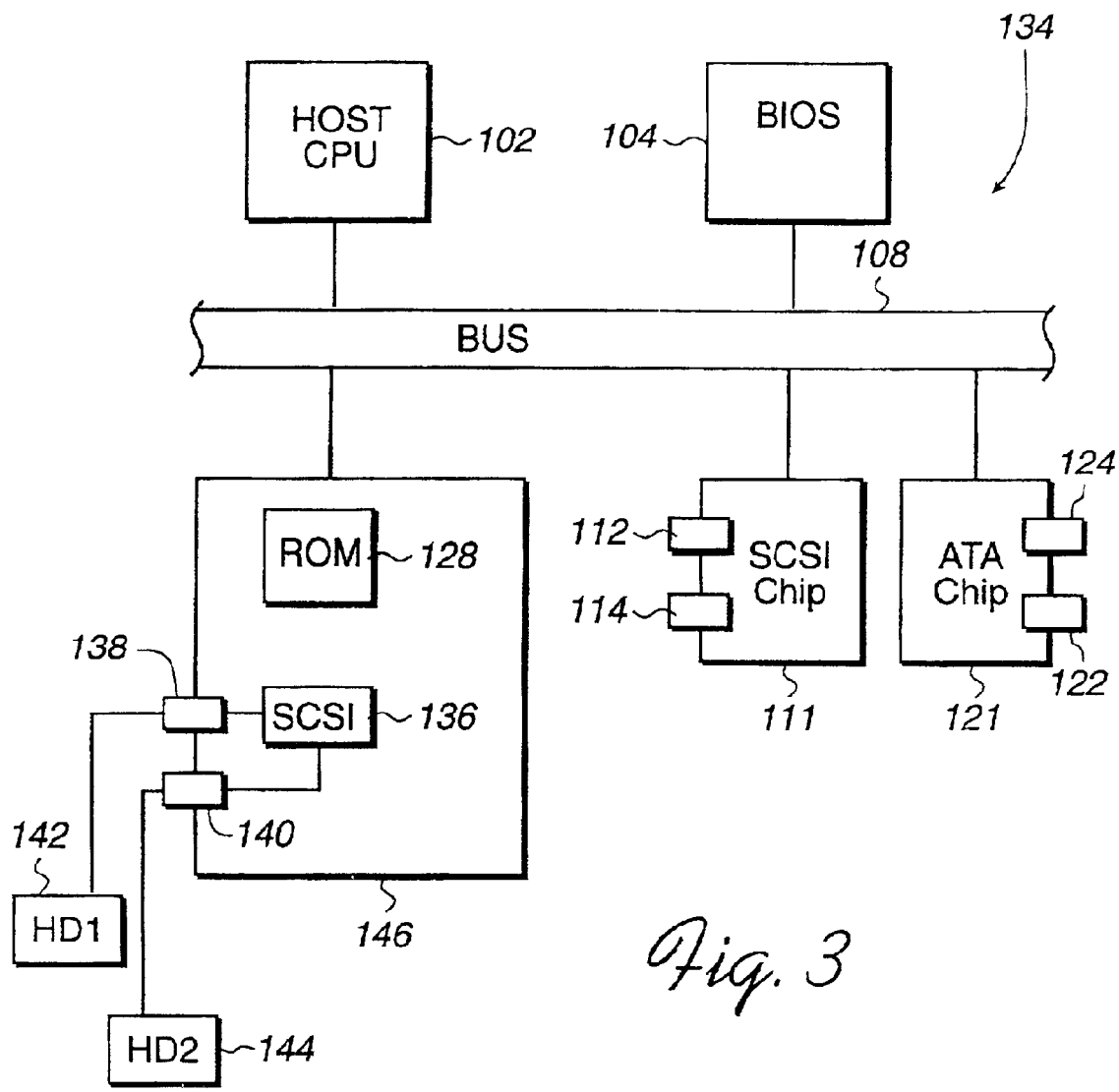
FIG. 3 illustrates a block diagram displaying an apparatus for implementing host based RAID through a RAID IO channel capture ROM in accordance with another embodiment of the invention.

FIG. 3 illustrates block diagram 126 displaying an apparatus for implementing host based RAID in accordance with another embodiment of the invention. A plug-in card 146 is attached to a bus 108. In accordance with one embodiment of the invention the IO channels 112, 114, 122, and 124 are in communication with a storage media such as one or more hard drives. The SCSI chip 136 of the plug-in card 146 has IO channels 138 and 140. The SCSI chip 136 is in communication with hard drive 1 (HD 1) 142 and hard drive 2 (HD2) 144 through the IO channels 138 and 140, respectively. It should be understood that the plug-in card contains an option ROM BIOS (not shown) for enabling identification of the peripheral devices attached to the SCSI chip 136.

Continuing with FIG. 3, the RAID IO channel capture ROM chip 128 executes software code enabling control of the IO channels to manage the storage media in communication with the IO channels in a RAID implementation. In accordance with one embodiment of the invention the plug-in card may be an Adaptec Host Adapter (AHA™) card. It should be appreciated that the plug-in card may be designed to plug-in to a PCI slot on the motherboard. As mentioned above, the RAID IO channel capture ROM chip 128 executes the code for locating, identifying and managing the IO channels of the motherboard as well as the IO channels of the adapter card 146. In accordance with another embodiment the IO channel capture code is executed by the CPU 102.

Figure 4:
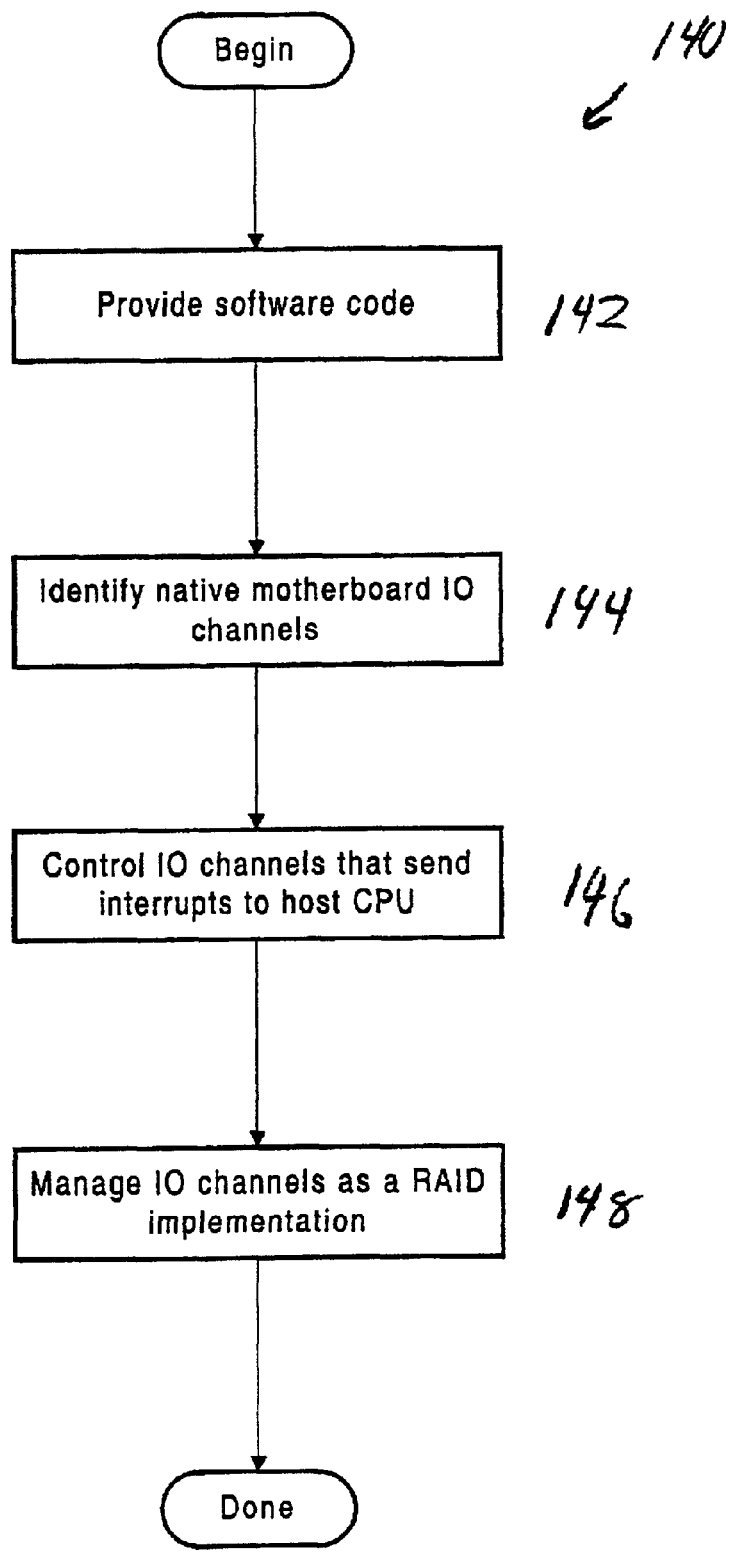
FIG. 4 illustrates a flowchart displaying a method for extending storage functionality at the BIOS level in accordance with one embodiment of the invention.

FIG. 4 illustrates flowchart 140 displaying a method for extending storage functionality at the BIOS level in accordance with one embodiment of the invention. Flowchart 140 initializes with operation 142 where a software code is provided. For example, the software code such as the IO channel capture code may be embedded within the BIOS of a personal computer or as a RAID IO channel capture ROM attached to the motherboard. In accordance with one embodiment of the invention, the ROM chip is located on a plug-in adapter card. Next, the method proceeds to operation 144 where the IO channels on the motherboard are identified. Here, a CPU of the host system or the IOP of ROM chip may execute the IO channel identification and capture code to identify the native IO channels.

Flowchart 140 then advances to operation 146 where control over the IO channels is exercised. In accordance with one embodiment of the invention, control is exercised over the IO channels which send interrupts to the host CPU. The method then proceeds to operation 148 where the IO channels being controlled are managed as a RAID. Operation 148 is explained in more detail in reference to FIG. 5.

Figure 5:
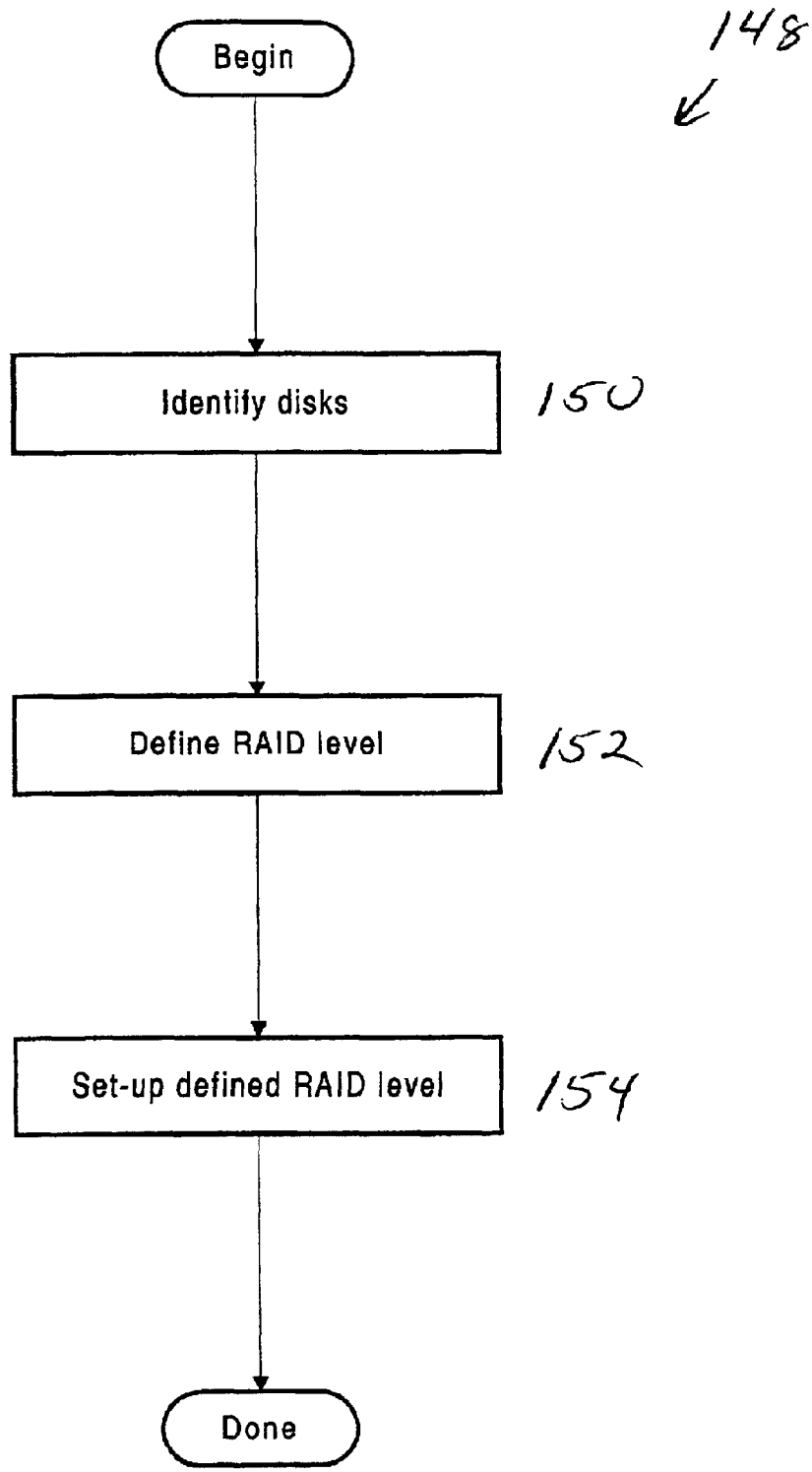
FIG. 5 illustrates a flowchart which is a more detailed description of the operation of managing IO channels as a RAID in accordance with one embodiment of the invention.

FIG. 5 illustrates flowchart 148 which is a more detailed description of operation 148 of FIG. 4 in accordance with one embodiment of the invention. Flowchart 148 initializes with operation 150 where disks associated with controlled IO channels are identified. Here, the disks identified are capable of being managed as a RAID such as at least one hard drive. Next, the method proceeds to operation 152 where the RAID level is defined. It should be appreciated that any of the RAID levels available are capable of being defined. For example, a user may define any RAID levels such as disk mirroring, bit by bit parity and disk striping. The method then ends with operation 154 where the defined RAID level is implemented. In accordance with one embodiment of the invention, the RAID IO capture ROM contains an Array Management Function to manage and control the disks and present their storage capacity as one or more disks.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An apparatus for implementing a host based RAID, comprising:
   a central processing unit (CPU);
   a communication chip, the communication chip containing native input/output (I/O) channels, the native IO channels being configured to carry interrupts, the communication chip in communication with the CPU over a single bus;
   a storage media, the storage media being accessed through the communication chip;
   a system basic input output system (BIOS), the system BIOS including a read only memory storing code configured to enable control of the native IO channels to manage the storage media associated with the native IO channels in a redundant array of inexpensive disk (RAID) implementation directly through the CPU; and the single bus connecting the CPU, the BIOS and the communication chip.

2. The apparatus as recited in claim 1, wherein the storage media is a plurality of hard drives.

3. The apparatus as recited in claim 1, wherein the communication chip is one of a SCSI chip and an ATA chip.

4. The apparatus as recited in claim 1, wherein the RAID implementation is any one of disk mirroring, bit by bit parity and disk striping.

5. The apparatus as recited in claim 1, wherein the bus is one of a PCI bus, an ISA bus and an EISA bus.

6. An apparatus for implementing a host based RAID, comprising:

a central processing unit (CPU);

a communication chip, the communication chip containing native input/output (IO) channels;

a plurality of storage devices, the plurality of storage devices being accessed through the communication chip;

a system basic input output system (BIOS);

a RAID IO channel capture read only memory (ROM) chip having an input/output processor (IOP), the ROM chip being configured to execute I/O channel identification and capture code, the code enabling control of the native IO channels to manage the plurality of storage devices associated with the native IO channels in a RAID implementation directly through the ROM chip; and a single bus interconnecting the CPU, the system BIOS, the ROM chip and the communication chip, wherein the communication chip is configured to issue interrupts directly to the CPU over the single bus.

7. The apparatus as recited in claim 6 wherein the storage devices are hard drives.

8. The apparatus as recited in claim 6, wherein the communication chip is one of a SCSI chip and an ATA chip.

9. The apparatus as recited in claim 6, wherein the RAID environment is any one of disk mirroring, bit by bit parity and disk striping.

10. The apparatus as recited in claim 6, wherein the bus is one of a PCI bus, an ISA bus and an EISA bus.

11. An apparatus for implementing a host based RAID, comprising:

a central processing unit (CPU);

a communication chip, the communication chip containing input/output IO channels;

a storage media, the storage media being accessed through the IO channels of the communication chip;

a basic input output system (BIOS);

a plug-in card, the plug-in card accommodating a read only memory (ROM) chip having an input/output processor (IOP), the ROM chip being configured to execute I/O channel identification and capture code enabling control of the IO channels to manage the storage media associated with the IO channels in a RAID environment directly through the ROM chip; and a single bus connecting the CPU, the BIOS, the plug-in card and the communication chip, wherein the communication chip is configured to issue interrupts directly to the CPU over the single bus.

12. The apparatus as recited in claim 11, wherein the plug-in card is an Adaptec Host Adapter (AHA) card.

13. The apparatus as recited in claim 11, wherein the plug-in card contains at least one communication chip.

14. The apparatus as recited in claim 13, wherein the communication chip is connected to a storage media.

15. The apparatus as recited in claim 14, wherein the storage media is a plurality of hard drives.

16. The apparatus as recited in claim 11, wherein the RAID environment is any one of disk mirroring, bit by bit parity and disk striping.

* * * * *